(12) United States Patent
Ho et al.

(10) Patent No.: US 9,079,575 B2
(45) Date of Patent: Jul. 14, 2015

(54) MACHINE POWERTRAIN CONTROL SYSTEM AND METHOD

(71) Applicant: Caterpillar Inc., Peoria, IL (US)

(72) Inventors: Aaron Y. Ho, Naperville, IL (US); Mark D. Anderson, Aurora, IL (US); Michael D. Mitchell, Aurora, IL (US); Cynthia A. Nastav, Oswego, IL (US); Ming Zhang, Naperville, IL (US); Derek J. Light, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 307 days.

(21) Appl. No.: 13/676,385

(22) Filed: Nov. 14, 2012

(65) Prior Publication Data

US 2014/0135172 A1    May 15, 2014

(51) Int. Cl.
| | |
|---|---|
| *B60W 10/06* | (2006.01) |
| *B60W 10/02* | (2006.01) |
| *B60W 30/19* | (2012.01) |
| *F16H 61/14* | (2006.01) |

(52) U.S. Cl.
CPC ............. *B60W 10/06* (2013.01); *B60W 10/026* (2013.01); *B60W 30/19* (2013.01); *F16H 61/14* (2013.01); *B60W 2710/0644* (2013.01); *B60Y 2200/411* (2013.01); *Y10T 477/677* (2015.01)

(58) Field of Classification Search
CPC ..................................................... B60W 10/06
USPC ........................................ 477/54, 62, 84, 109
See application file for complete search history.

(56) References Cited

U.S. PATENT DOCUMENTS

| | | | |
|---|---|---|---|
| 4,027,554 A | 6/1977 | Ito et al. | |
| 4,414,863 A | 11/1983 | Heino | |
| 6,080,083 A | 6/2000 | Nishino | |
| 6,976,930 B2 * | 12/2005 | Winzeler | 475/277 |
| 8,510,002 B2 * | 8/2013 | Sakai et al. | 477/111 |
| 8,801,571 B2 * | 8/2014 | Velamakanni et al. | 477/107 |
| 2010/0318267 A1 | 12/2010 | Murata et al. | |
| 2013/0018554 A1 * | 1/2013 | Steinlage et al. | 701/54 |

FOREIGN PATENT DOCUMENTS

EP     644360     3/1995

* cited by examiner

*Primary Examiner* — Jacob S Scott
(74) *Attorney, Agent, or Firm* — Leydig, Voit & Mayer, Ltd.

(57) ABSTRACT

A machine having a powertrain including an engine operably connected to a torque converter and a transmission. The machine includes a control system receive an activation signal indicative of an automatic mode operation of the machine and command the torque converter to remain in a direct-drive mode while the transmission shifts from a first gear ratio to a second gear ratio. The control system also limits engine speed below a first engine speed limit when a gear ratio setting of the transmission is indicative of the second gear ratio.

20 Claims, 3 Drawing Sheets

MACHINE POWERTRAIN CONTROL SYSTEM AND METHOD

TECHNICAL FIELD

This patent disclosure relates generally to a powertrain of a machine and more particularly, to a control system for the powertrains that includes a torque converter and a transmission.

BACKGROUND

A compactor is adapted to compact a material to a desired density. The compactor may be a landfill compactor or a soil compactor. Examples of applications include, but not limited to, construction sites to prevent natural settling of the ground, landfill sites to compact the landfill waste into a small volume as possible, and blacktop roads and parking lots, to prevent settling of the blacktop, and hence prevent future cracking of the road or the parking lots.

The landfill compactor is propelled by a powertrain having an engine connected to a transmission via a torque converter. One characteristic of torque converters is their ability to multiply torque when there is a difference between the input speed to the converter from the engine and the output speed of the converter to the transmission. Some torque converters also include a locking mechanism that transfers engine speed directly to the transmission with no substantial torque multiplication or speed variation. The landfill compactor may be desired to run in a second gear transmission ratio for efficient fuel management. Further, the use of torque converter in the second gear transmission ratio may overheat the torque converter due to heavy loading conditions and may lead to inefficiency of the landfill compactor. In the second gear, speed of the engine may limit for efficient compacting of the material.

U.S. Pat. No. 4,414,863 discloses a controller including a microprocessor for automatically shifting a transmission and selectively locking and unlocking a torque converter connecting the engine with the transmission. The controller has both manual and automatic modes of operation. In the automatic mode, one of three different shift patterns is automatically selected depending on the condition of a transport/loading mode switch and a throttle position switch. Transmission output speed is monitored and downshifts are prevented when the output is accelerating.

SUMMARY

In an aspect of the present disclosure discloses a machine having a powertrain including an engine operably connected to a torque converter and the torque converter further connected to a transmission. The machine is provided with a selector interface configured to activate a manual mode operation or an automatic mode operation of the machine. Further, the machine includes a control system receive an activation signal indicative of an automatic mode operation of the machine and command the torque converter to remain in a direct-drive mode while the transmission shifts from a first gear ratio to a second gear ratio. The control system is further configured to limit an engine speed below a first engine speed limit when a gear ratio setting of the transmission is indicative of the second gear ratio.

In another aspect of the present disclosure, a method for operating the machine includes commanding the torque converter to remain in a direct-drive mode while the transmission shifts from a first gear ratio to a second gear ratio while the automatic mode operation of the machine is activated. The method further includes limiting the engine speed below the first engine speed limit when the gear ratio setting of the transmission indicates the second gear ratio.

Other features and aspects of this disclosure will be apparent from the following description and the accompanying drawings.

DETAILED DESCRIPTION

Figure 1:
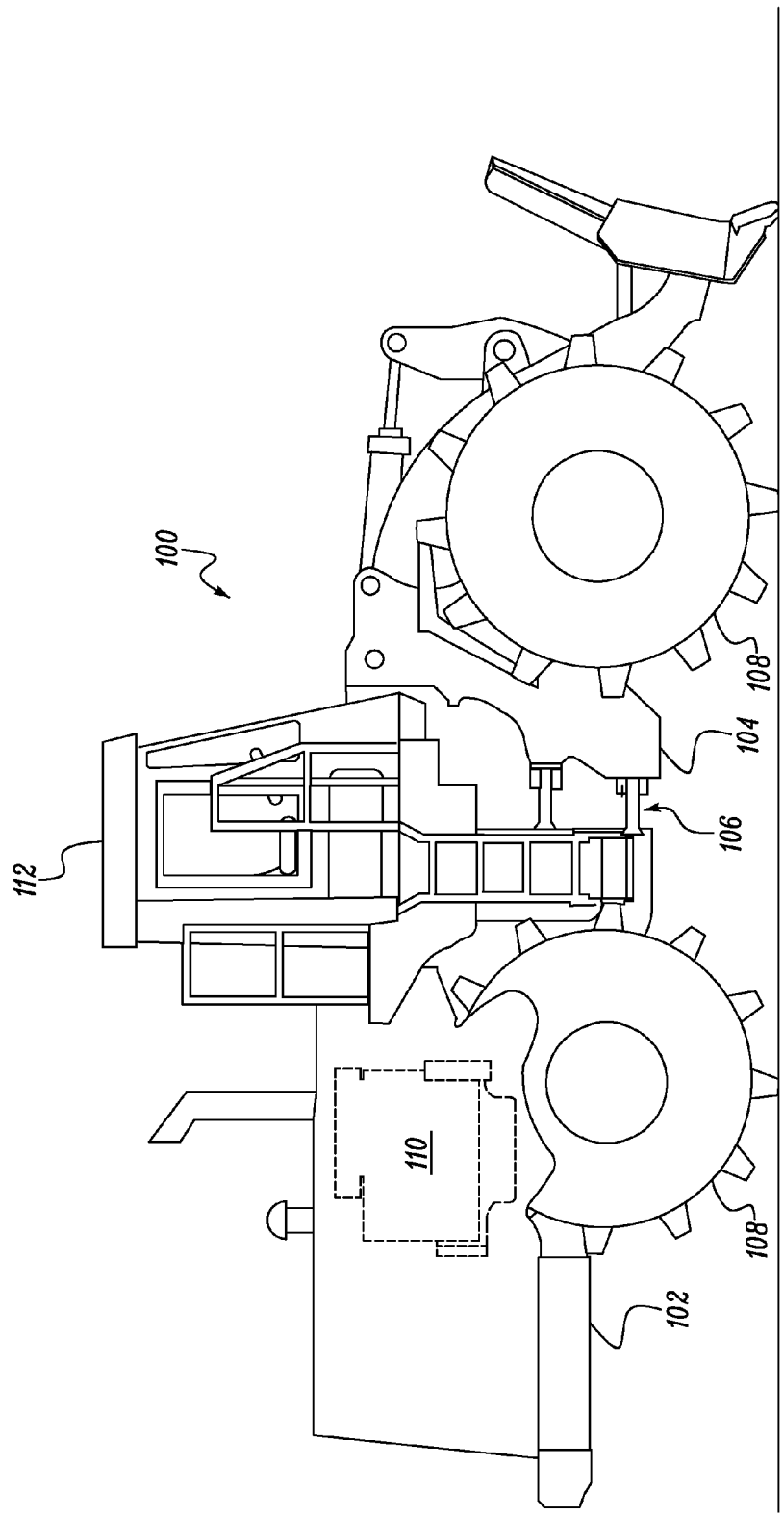
FIG. 1 is an outline side view of a landfill compactor, in accordance with the present disclosure.

This disclosure generally relates to a powertrain of a machine having a transmission and, more particularly, to the powertrains that includes a torque converter capable of directly and selectively linking an output of an engine with the transmission. FIG. 1 illustrates a side view of a machine 100 embodied a landfill compactor, in which various embodiments of the present disclosure may be implemented. In the illustrated embodiment, the machine 100 may include an engine frame portion 102 connected to a non-engine frame portion 104 by an articulated joint 106. Further, a set of wheels 108 may support the engine frame portion 102 and the non-engine frame portion 104 on ground. The engine frame portion 102 includes an engine 110 to provide power to the set of the wheels 108. The machine 100 further includes an operator station 112 that houses various control devices.

Figure 2:
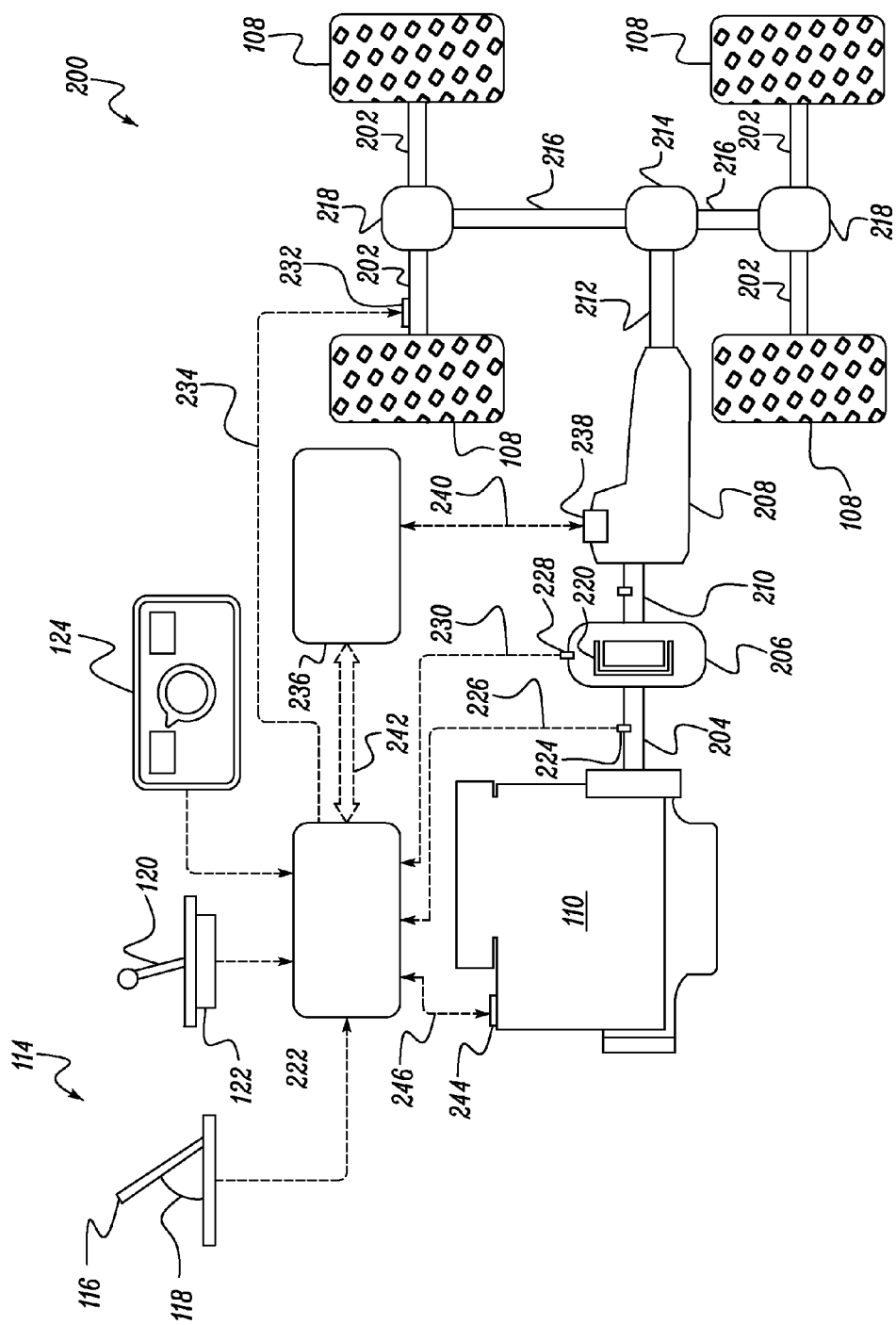
FIG. 2 is a schematic diagram of a powertrain of the landfill compactor, in accordance with the present disclosure.

FIG. 2 illustrates a schematic of a powertrain 200 associated with the machine 100. In reference to FIGS. 1 and 2, the powertrain 200 may include respective axles 202 connected to the set of wheels 108. An engine output shaft 204 is connected to a torque converter 206, and the torque converter 206 is further connected to a transmission 208 via a transmission input shaft 210. Further, a transmission output shaft 212 is connected to a splitter 214 that powers two drive shafts 216, one for each of the axle 202. Each of the drive shaft 216 transmits power to the wheels 108 via respective differentials 218 such that rotational power produced at the engine output shaft 204 is transmitted to the wheels 108. The torque convertor 206 may be a hydro-mechanical device configured to couple the engine 110 with the transmission 208. The torque converter 206 may include a lock-up clutch 220 for selectively coupling the engine output shaft 204 to the transmission input shaft 210. The transmission 208 may embody a multi-speed, bidirectional, mechanical transmission having a neutral gear ratio, a plurality of forward gear ratios, and a plurality of reverse gear ratios. In an embodiment, the forward gear ratios may include a first gear ratio and a second gear ratio.

Moreover, the machine 100 may include one or more operator interface devices 114 located in the operator station 112. The operator interface devices 114 may include a throttle pedal 116 having a throttle position sensor (TPS) 118, and a gear selector lever 120 having a lever encoder 122. The TPS 118 and the lever encoder 122 are configured to provide a desired ground speed signal indicative of a desired machine speed and a current gear ratio setting of the transmission 208 that is commanded by an operator during the operation. In an aspect of the present disclosure, the operator interface devices 114 may also include a selector interface 124 configure to select a manual mode or an automatic mode operation of the machine 100. The selector interface 124 may embody a switch, a dial, a lever, a touch based interface, or a voice based interface or the like.

As shown in FIG. 2, a control system 222 is provided to regulate the operation of the powertrain 200. The control system 222 may be an electronic controller that may include a processor operably associated with other electronic components such as data storage devices and various communication channels. The control system 222 is connected to an engine output shaft speed sensor 224 via an engine speed communication channel 226, a torque converter locked state sensor 228 via a torque converter communication channel 230, and a machine ground speed sensor 232 via a ground speed communication channel 234. The control system 222 may regulate the operation of the powertrain 200 in response to signals indicative of the operation of the powertrain 200 as well as the signals received from the operator interface devices 114, such as the TPS 118, the lever encoder 122, and the selector interface 124.

The powertrain 200 may further include a transmission controller 236, which is configured to control the operation of the transmission 208. The transmission controller 236 is connected to a transmission interface 238 via a transmission communication channel 240. The transmission interface 238 may include a data structure that can selectively engage the transmission 208 in the first gear ratio or the second gear ratio in response to a command from the transmission controller 236. The transmission interface 238 may also provide information to the transmission controller 236 indicative of the current gear ratio setting as well as other information, such as the power transmitted to the wheels 108 through the transmission 208, the speed of the transmission output shaft 212, the speed of the transmission input shaft 210, and the like. In the illustrated embodiment, information may be exchanged between the control system 222 and the transmission controller 236 via a data bus 242. However, it should be appreciated that although the control system 222 and the transmission controller 236 are shown as separate components they may alternatively be integrated into a single control unit. For example, a master controller may be operatively implemented within an engine control unit (ECU), used to control the engine 110. The functionality of these devices, while shown conceptually in FIG. 2 that include various discrete functions for illustrative purposes only, may be implemented in hardware and/or software without regard to the discrete functionality shown. Accordingly, various interfaces of the control system 222 and the transmission controller 236 are described relative to the other components of the powertrain 200 in FIG. 2, which follows such interfaces, are not intended to limit other type of components.

According to an embodiment of the present disclosure, the control system 222 is configured to send a speed command signal to an engine interface 244 associated with the engine 110 via an engine communication channel 246 based on an activation signal received from the selector interface 124 indicative of the automatic mode operation of the machine 100. The speed command signal may limit the engine speed at the engine output shaft 204 below a first engine speed limit. In an embodiment, the first engine speed limit may be a transmission requested engine speed limit (TRESL) and may lie in a range of about 1200 rpm to 1600 rpm. In an embodiment, the first engine speed limit is 1600 rpm. However, it will be apparent to a person having ordinary skill in the art that the first engine speed limit may vary based on the application and size of the engine 110 and the transmission 208. Further, the speed command signal may be based on the current gear ratio setting of the transmission 208 received and processed by the control system 222 via the transmission controller 236. In an embodiment, the speed command signal may be transmitted when the gear ratio setting of the transmission 208 is indicative of the second gear ratio. As described above, the control system 222 is configured to receive a ground speed signal from the machine ground speed sensor 232 via the ground speed communication channel 234. In an embodiment, the first engine speed limit may also be based on the ground speed signal, such a machine speed in the second gear ratio of the transmission 208 is below a ground speed limit. In an embodiment, the ground speed limit is 4.0 mph.

The control system 222 is also configured to shift gear ratio settings of the transmission 208 during the automatic mode operation of the machine 100. The gear ratio settings of the transmission 208 may be activated through the torque converter 206 either in a converter-drive operating mode ("CD") or in a direct-drive operating mode ("DD"), when the lock-up clutch 220 is in a locked position. In an embodiment of the present disclosure, during the automatic mode operation of the machine 100, the control system 222 may command the torque converter 206 to remain in the direct-drive mode (DD) while the transmission 208 shifts from the first gear ratio to the second gear ratio. Moreover, an up-shift and a down-shift sequences for the powertrain 200 during the automatic mode operation of the machine 100 may be:

1CD→1DD→2DD(during up-shift)

2DD→1DD→1CD(during down-shift)

where the numbers 1-2 represent the first gear ratio and the second gear ratio settings of the transmission 208, "CD" represents the converter-drive mode of the torque converter 206, and "DD" represents the direct-drive mode of the torque converter 208. In an embodiment, during the up-shift in the automatic mode operation of the machine 100, the shift in the gear ratio settings of the transmission 208 from 1DD→2DD may occur at a substantially full throttle position. A throttle position signal is configured to be received by the control system 222 from the TPS 118 associated with the throttle pedal 116.

According to another aspect of the present disclosure, in the manual mode operation of the machine 100, while shifting the gear ratio settings of the transmission 208 from direct-drive mode first gear ratio (1DD) to the second gear ratio, the control system 222 is configured to automatically lock the lock-up clutch 220. Thus, achieve 1DD→2DD shift in the gear ratio settings of the transmission 208 during the up-shift in the manual mode operation of the machine 100.

Moreover, the control system 222 is also configured to limit the engine speed from passing a second engine speed limit. The second engine speed limit may be a threshold engine speed to restrict an uncontrolled increase in the engine speed, leading to a mechanical failure. In an embodiment, the control system 222 may receive an engine speed signal from the engine output shaft speed sensor 224 via the engine speed communication channel 226, and monitor for an over-speed condition of the engine 110. Based on the over-speed condition of the engine 110, the control system 122 may further regulate the air/fuel supply to control the engine speed below the second engine speed limit.

Furthermore, it will be apparent to a person having ordinary skill in the art that the control system 222 may further be operating in conjunction or cooperation with other control schemes or algorithms, which are not shown for simplicity. Relative to the present disclosure, the control system 222 operates to select an appropriate set of engine power curves depending on the operating conditions of the engine 110, the torque converter 206 and the transmission 208.

INDUSTRIAL APPLICABILITY

The industrial applicability of the systems and methods for controlling a powertrain having a torque converter connected to a transmission in a machine described herein will be readily appreciated from the foregoing discussion. Although the machine 100 shown as the landfill compactor, any type of machine that performs at least one operation associated with, for example, mining, construction, and other industrial applications may embody the disclosed systems and methods. The machine 100 may also be associated with non-industrial uses and environments, such as, for example, cranes, earthmoving vehicles, backhoes, and/or material handling equipment.

In accordance with an embodiment of the present disclosure, largely, the operating performance of a machine such as, material compaction performance in case of the landfill compactor, is based on the machine speed of the machine and a rolling resistance experienced by the machine. Typically, engine load/power of the machine is controlled based on the machine speed and the rolling resistance experienced by the machine to achieve an optimal operating performance. Moreover, the machine speed is required to be maintained below a ground speed limit to achieve the optimal operating performance. Usually, to achieve the optimal operating performance and the fuel efficiency, the machine is operated in the second gear ratio of the transmission with a converter-drive mode of the torque converter to maintain the machine speed below the ground speed limit. However, the torque convertor may be overheated due to continuous working cycles of the machine in the second gear ratio with the converter-drive mode. This may adversely effect a lifetime of the torque convertor and reduce the performance of the overall powertrain.

According to an embodiment, the control system 222 may limit the engine speed below the pre-determined speed (TRESL) in the second gear ratio of the transmission 208 and select the torque convertor 206 in the direct-drive mode (DD) to achieve a desired machine speed while operating. Advantageously, the control system 222 may achieve fuel efficiency by operating in the second gear ratio, optimal operating performance by maintaining the desired machine speed, and avoid overheating of the torque convertor 206 by remaining in the direct-drive mode (DD) while in the second gear ratio.

Figure 3:
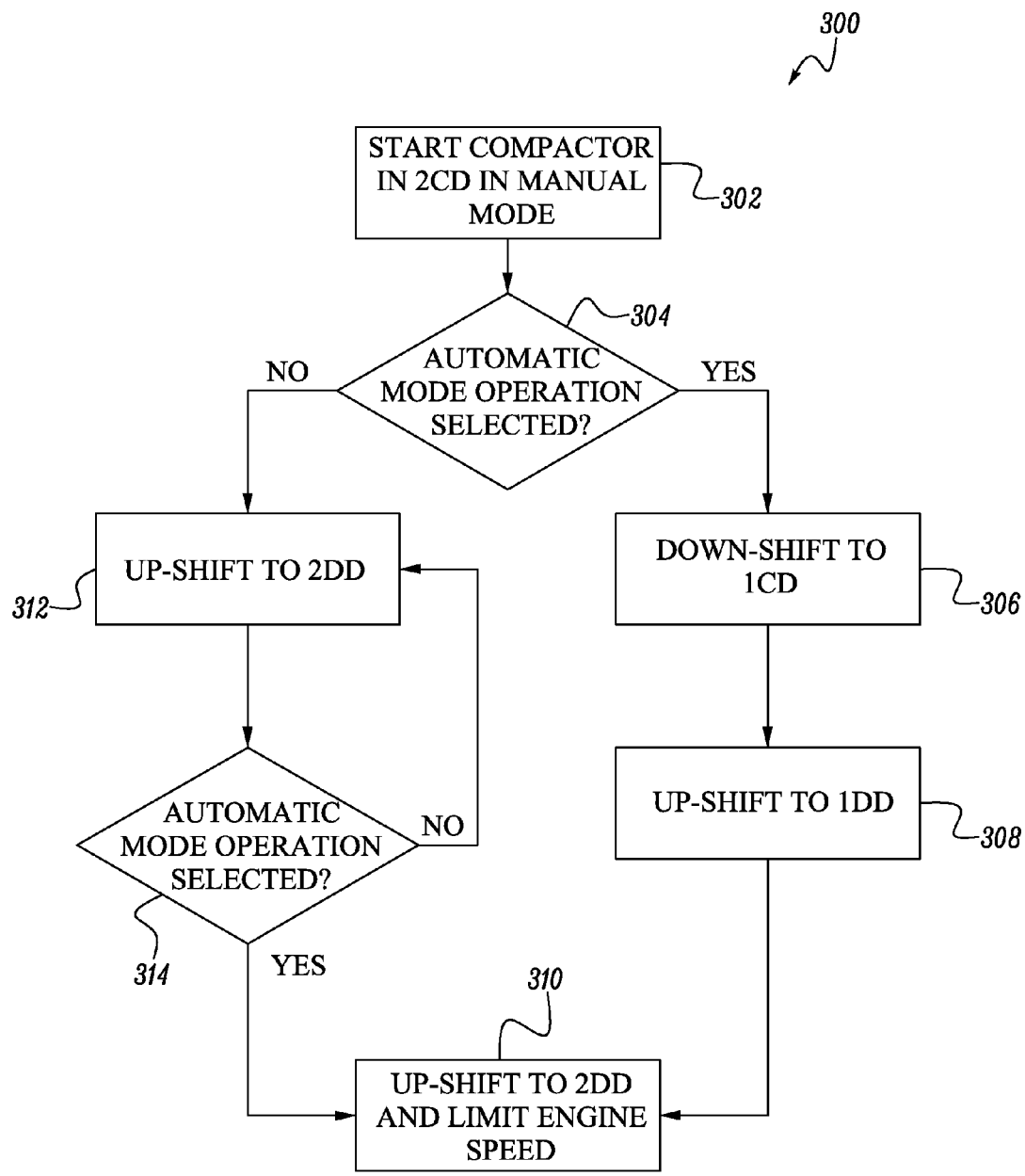
FIG. 3 is a flowchart for an exemplary transmission transition strategy in the landfill compactor, in accordance with an embodiment of the present disclosure.

FIG. 3 illustrates a flowchart for an exemplary transmission transition strategy 300 in the landfill compactor, in accordance with one embodiment of the present disclosure. At step 302, an operator may start the landfill compactor in the converter-drive mode second gear ratio (2CD) to initiate compaction process. At step 304, the operator may select the automatic mode operation of the landfill compactor, if the automatic mode operation is selected (Step 304: YES), the control system 222 may down-shift the powertrain 200 to the converter-drive mode first gear ratio (1CD) at step 306. Following step 306, the control system 222 may up-shift the powertrain 200 to the direct-drive mode first gear ratio (1DD) by locking the lock-up clutch 220 at step 308. In an embodiment, the control system 222 may provide a delay of a pre-determined time during the up-shift from 1CD→1DD to minimize any undesirable loading/jerks on the lock-up clutch 220. The pre-determined time may be in a range of about 2 seconds to 5 seconds. Further, as described above, at step 310, based on the machine speed associated with the landfill compactor and/or the throttle position signal, the control system 222 may up-shift the powertrain 200 to the second gear ratio of the transmission 208 while commanding the torque convertor 208 to remain in the direct-drive mode. In the second gear ratio and the direct-drive mode (2DD), the machine speed associated with the landfill compactor may be limited below the ground speed limit while compacting the material. At step 310, the control system 222 may also limit the engine speed below the first engine speed limit to achieve the optimal compaction performance and the fuel efficiency in the landfill compactor. At step 310, control system 22 may also monitor for an over-speed condition of the engine 110 and limit the engine speed from passing the second engine speed limit.

Moreover, if the automatic mode operation is not selected at step 304 (Step 304: NO), the control system 222 may up-shift the powertrain 200 to the direct-drive mode second gear ratio (2DD) based on an input from the operator and the machine speed at step 312. In this mode, the landfill compactor may be primarily cruising without performing compaction of material. However in case operator select to the automatic mode operation of the landfill compactor at step 314, the control system 222 go to step 310 by limiting the engine speed below the first engine speed limit to achieve the optimal compaction performance and fuel efficiency.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A machine having a powertrain, the powertrain including an engine operably connected to a torque converter, the torque converter connected to a transmission, the machine comprising:

a selector interface configured to activate a manual mode operation or an automatic mode operation of the machine; and a control system configured to:
receive an activation signal from the selector interface indicative of the automatic mode operation of the machine; and when in the activation signal is received to:
command the transmission to shift from a second gear ratio to a first gear ratio when the torque converter is in a converter drive mode;
command the torque converter to switch the converter drive mode to a direct drive mode;
command the torque converter to remain in the direct-drive mode while the transmission shifts from the first gear ratio to the second gear ratio; and
send a speed command signal to the engine to limit an engine speed below a first engine speed limit when a gear ratio setting of the transmission is indicative of the second gear ratio.

2. The machine of claim 1, wherein the control system is further configured to receive the gear ratio setting of the transmission from a transmission controller.

3. The machine of claim 1, wherein the control system is further configured to limit the engine speed from passing a second engine speed limit.

4. The machine of claim 3, wherein the first engine speed limit is a transmission requested engine speed limit.

5. The machine of claim 3, wherein the first engine speed limit is 1600 rpm.

6. The machine of claim 1, wherein the control system is further configured to receive a ground speed signal and limit a machine speed below a ground speed limit.

7. The machine of claim 6, wherein the ground speed limit is 4.0 mph.

8. A method for operating a machine having a powertrain, the powertrain including an engine operably connected to a torque converter, the torque converter connected to a transmission, the method comprising:
activating an automatic mode operation of the machine; and when the automatic mode operation is activated:
commanding the transmission to shift from a second gear ratio to a first gear ratio when the torque converter is in a converter drive mode;
commanding the torque converter to switch from the converter drive mode to a direct drive mode;
commanding the torque converter to remain in the direct-drive mode while the transmission shifts from the first gear ratio to the second gear ratio; and
sending a signal to the engine limiting an engine speed below a first engine speed limit when a gear ratio setting of the transmission is indicative of the second gear ratio.

9. The method of claim 8 further comprises receiving the gear ratio setting of the transmission from a transmission controller.

10. The method of claim 8 further comprises limiting the engine speed from passing a second engine speed limit.

11. The method of claim 10, wherein the first engine speed limit is a transmission requested engine speed limit.

12. The method of claim 10, wherein the first engine speed limit is 1600 rpm.

13. The method of claim 8 further comprises receiving a ground speed signal and limiting a machine speed below a ground speed limit.

14. A landfill compactor having a powertrain, the powertrain including an engine operably connected to a torque converter, the torque converter connected to a transmission, the landfill compactor comprising:
a selector interface configured to activate a manual mode operation or an automatic mode operation of the landfill compactor; and
a control system configured to:
receive an activation signal from the selector interface indicative of the automatic mode operation of the landfill compactor; and when the activation signal is receive to:
command the transmission to shift from a second gear ratio to a first gear ratio when the torque converter is in a converter drive mode;
command the torque converter to switch from the converter drive mode to a direct drive mode;
command the torque converter to remain in the direct-drive mode while the transmission shifts from the first gear ratio to the second gear ratio; and
send a speed command signal to the engine to limit an engine speed below a first engine speed limit when a gear ratio setting of the transmission is indicative of the second gear ratio.

15. The landfill compactor of claim 14, wherein the control system is further configured to receive the gear ratio setting of the transmission from a transmission controller.

16. The landfill compactor of claim 14, wherein the control system is further configured to limit the engine speed from passing a second engine speed limit.

17. The landfill compactor of claim 16, wherein the first engine speed limit is a transmission requested engine speed limit.

18. The landfill compactor of claim 16, wherein the first engine speed limit is 1600 rpm.

19. The landfill compactor of claim 14, wherein the control system is further configured to receive a ground speed signal and limit a machine speed associated with the landfill compactor below a ground speed limit.

20. The landfill compactor of claim 19, wherein the ground speed limit is 4.0 mph.

* * * * *